United States Patent

Haglund

[11] Patent Number: 5,566,431
[45] Date of Patent: Oct. 22, 1996

[54] LOCKING ARRANGEMENT

[75] Inventor: Lennart Haglund, Vargarda, Sweden

[73] Assignee: Autoliv Development AB, Vargarda, Sweden

[21] Appl. No.: 381,435

[22] Filed: Jan. 31, 1995

[30] Foreign Application Priority Data

Feb. 11, 1994 [GB] United Kingdom ............... 9402695

[51] Int. Cl.$^6$ ...................................... A44B 11/25
[52] U.S. Cl. ........................ 24/633; 297/378.13
[58] Field of Search .................. 297/378.13; 24/170, 24/191, 634, 616, 633–640; 296/65.1, 68.1

[56] References Cited

U.S. PATENT DOCUMENTS

| 3,179,997 | 4/1965 | Jalinaud | 24/637 X |
| 3,852,854 | 12/1974 | Sigrud et al. | 24/637 X |
| 4,667,492 | 5/1987 | Tomatsu et al. | 297/378.13 X |
| 4,679,853 | 7/1987 | Emanuelson | 24/643 X |
| 4,708,385 | 11/1987 | Kondo | 297/378.13 X |
| 4,765,682 | 8/1988 | Satoh | 297/378.13 |
| 4,869,541 | 9/1989 | Wainwright | 297/378.13 X |
| 5,383,699 | 1/1995 | Woziekonski et al. | 296/65.1 |

FOREIGN PATENT DOCUMENTS

| 3720704 | 1/1989 | Germany | 24/633 |
| 2202264 | 9/1988 | United Kingdom. | |
| WO88/06012 | 8/1988 | WIPO | 24/633 |

Primary Examiner—Jose V. Chen
Assistant Examiner—Robert J. Sandy
Attorney, Agent, or Firm—Spencer & Frank

[57] ABSTRACT

A locking arrangement is provided comprising a retaining element which is positionable to retain a lockable element in position. A combination of an actuating element and a counter weight are provided which are inter-connected to rotate simultaneously in a predetermined manner about axes of rotation. The centers of gravity of the actuating element and the counter weight are so positioned that when subjected to acceleration or deceleration the two components are substantially in balance and do not tend to move. One of the components blocks movement of the retaining element, when the arrangement is in the locked condition, but if the actuating element is moved rotationally, the counter weight will move rotationally, and as a consequence the retaining element will be released, the retaining element then being movable to a position in which the lockable element can be separated from the locking arrangement.

The locking arrangement may form part of a latch to retain part of the seat and safety belt assembly in position within a motor vehicle or may form part of a buckle to retain a tongue associated with a safety belt.

10 Claims, 10 Drawing Sheets

LOCKING ARRANGEMENT

BACKGROUND OF THE INVENTION

The present invention relates to a locking arrangement and more particularly relates to a locking arrangement suitable for use in a motor vehicle where the locking arrangement may be subject to acceleration and deceleration. The locking arrangement of the invention is intended to be such that if subjected to acceleration or deceleration, the locking arrangement will not inadvertently release.

It has been proposed previously to provide a locking arrangement for use in a seat belt buckle (which is a component intended for use in a motor vehicle which may be subject to acceleration or deceleration) which is designed so that the buckle will not inadvertently release when subjected to acceleration or deceleration. One example of such a locking arrangement is shown in GB-A2202264 where the buckle is provided with a pivoted control lever and a pivoted locking element. In this buckle, however, when the control lever is actuated the locking element is positively moved out of its locking position, and the locking element itself is "self-locking". This leads to high forces being required to open the buckle.

OBJECT OF THE INVENTION

The present invention seeks to provide an improved locking arrangement which can be used not only within a buckle, but also to lock other items within a motor vehicle.

BRIEF SUMMARY OF THE INVENTION

According to this invention there is provided a locking arrangement movable between a locking condition and a release condition, the locking arrangement being adapted to retain a lockable element when in the locking condition and to release that lockable element when in the release condition, the locking arrangement comprising a retaining element adapted to move to a position to retain the locking element when in the locked condition and adapted to move to such a position that the lockable element is not retained when the locking mechanism is in the release condition, there being an actuating element and a counter weight associated with the retaining element, the actuating element and the counter weight both being pivotally mounted in position on parallel pivot axes and being interconnected so that rotation of one of the actuating element and the counter weight in one direction causes a rotation of the other element in the opposite direction, the actuating element and the counter weight having their centres of gravity located in the plane defined by the parallel pivot axes, or offset to one side of that plane, so that any force on the locking arrangement tending to rotate one element in one direction will tend to cause the other element to rotate in the same direction so that the elements are substantially "in balance" with regard to any force applied to the locking mechanism, the actuating element and counter weight being movable manually between a first position in which the combination of the actuating element and the counter weight lock the retaining element in the position in which it retains the lockable element, and a second position in which the retaining element is free to move to the position in which the lockable element is not retained.

In one embodiment the retaining element is locked in position by engaging part of the counter weight. In an alternative embodiment the retaining element is locked in position by engaging part of the actuating element.

In one arrangement the locking arrangement forms part of a buckle and the lockable element comprises a tongue associated with a safety belt.

In an alternative arrangement the locking arrangement is adapted to retain in position a tiltable element forming part of the back-rest of a seat in a motor vehicle.

Conveniently the said tiltable part of the backrest comprises only part of the back-rest, there being another part of the back-rest.

Advantageously the said another part of the back-rest is also tiltable and is provided with its own respective locking arrangement as described above.

Advantageously the locking arrangement is present on a beam which extends transversely of the vehicle, the beam being tiltable relative to the vehicle.

Preferably the beam is tiltable relative to the back-rest about an axis defined by the said lockable element.

BRIEF DESCRIPTION OF THE DRAWINGS

In order that the invention may be more readily understood, and so that further features thereof may be appreciated, the invention will now be described, by way of example, with reference to the accompanying drawings in which.

DESCRIPTION OF THE PREFERRED EMBODIMENTS

Figure 1:
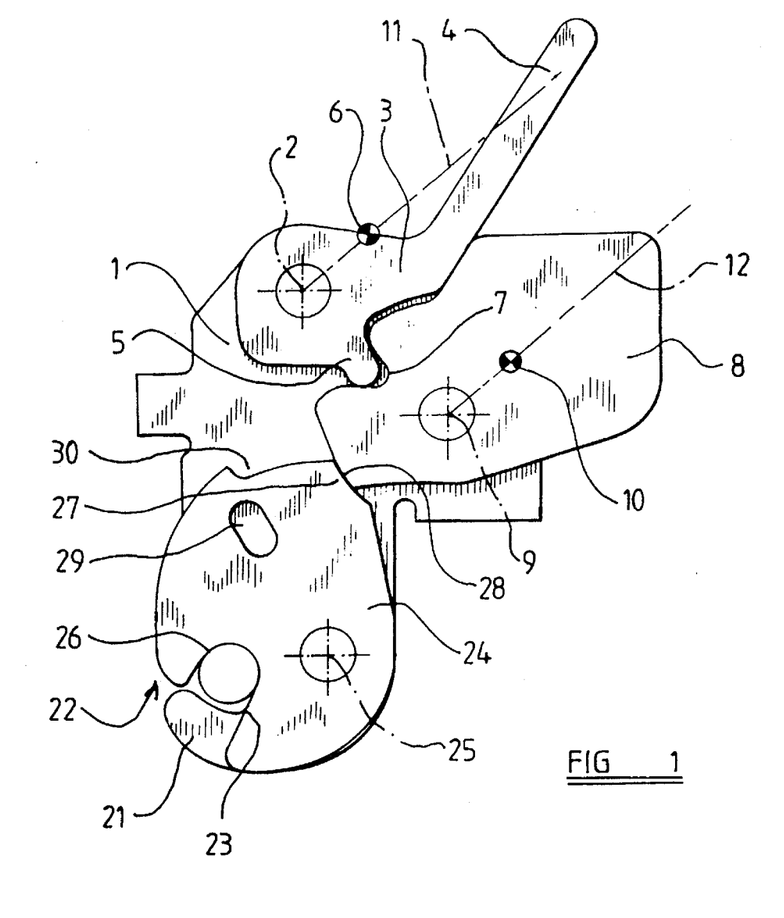
FIG. 1 is a diagrammatic view of a locking arrangement in accordance with the invention in a locked condition.

Referring initially to FIG. 1, a locking arrangement in accordance with the invention is illustrated in the locked condition. The locking arrangement comprises a support plate 1. Pivotally connected about a pivot axis 2 to the support plate 1 is an actuating element 3. The actuating element 3 has a projecting handle portion 4 and a further projecting lug 5. The actuating element 3 has a centre of gravity 6.

The projecting lug 5 is received within a recess 7 forming part of a counter weight member 8 which is also pivotally mounted on the support plate 1 for pivotal movement about a pivot axis 9. The pivot axis 9 is parallel with the pivot axis 2. The counter weight 8 has a centre of gravity 10.

It is to be observed that a line 11, joining the centre of gravity 6 and the pivot axis 2 for the actuating element 3, is parallel (in this figure) with a line 12 joining the centre of gravity 10 and pivot axis 9 of the counter weight 8. It is also to be observed that both of the centres of gravity are offset to one side of a plane extending through and defined by the parallel pivot axes 2 and 9.

It is also to be noted that by virtue of the interconnection of the projection 5 and the recess 7, any movement of the counter weight 8 in the clockwise direction about the pivot axis 9 causes a corresponding movement of the actuating element 3 in the counter-clockwise direction about the pivot axis 2. Similarly, any movement of the actuating element 3 about the pivot axis 2 in the counter-clockwise direction will cause a movement of the counter weight 8 about the pivot axis 9 in the clockwise direction.

It is also to be observed that, in the position illustrated in FIG. 1, the actuating element 3 and the counter weight 8 contact each other at a plurality of points and consequently it is impossible for the actuating element 3 to move in the clockwise direction and also it is impossible for the counter weight 8 to move in the counter-clockwise direction.

The mass of the actuating element 3 and the mass of the counter weight 8 and the positions of the centres of gravity relative to the respective pivot axis have been selected so that if any force is experienced by the locking arrangement which tends to rotate the actuating element 3 in the counter-clockwise direction, that same force will also tend to rotate the counter weight 8 in the counter-clockwise direction. If the force is to move the actuating element in the counter-clockwise direction, the counter weight 8 must simultaneously move in the clockwise direction, because of the inter-engagement of the projection 5 and recess 7. However, the force is actually tending to rotate the counter weight in the counter-clockwise direction, which means that the counter weight firmly resists any movement of the actuating element 3 in the counter-clockwise direction. Thus, the effect of a force applied to the actuating element 3 and the counter weight 8 is substantially balanced out. A similar situation exists if a force is exerted which tends to rotate the counter weight in the clockwise direction. The force may be an acceleration or deceleration force with a component parallel to the plane defined by the parallel pivot axes 2 and 9, or may be a rotational force.

It is thus to be appreciated that, even if the illustrated and described components are subjected to acceleration or deceleration, or to rotation, the components will not move from the position illustrated.

Part 21 of the support plate 1 defines an elongate recess 22 dimensioned to receive a lockable element 23 which, in the described embodiment, comprises a metal rod or bar of circular section. A retaining element 24 is provided which is pivotally connected to the support plate 1 for pivotal movement about a pivot axis 25.

The retaining element 24 defines an elongate slot 26 which accommodates the lockable element 23 in the position of the components illustrated in FIG. 1. The lockable element 23 is thus retained within the elongate recess 22 and within the elongate slot 26, but since the axes of the slots are not co-aligned the lockable element 23 cannot freely escape and is thus retained in position. As will be explained, the retaining element 24 is prevented from rotating to release the lockable element 23.

The periphery of the retaining element 24 is not circular. A linear part 27 abuts an end face 28 of the counter weight 8, thus preventing clockwise rotation of the retaining element.

An aperture 29 is formed in the retaining element 24 adapted to receive one end of a spring (not shown in FIGS. 1 and 2) which tends to rotate the retaining element 24 in the clockwise direction. The spring also biases the actuating element 3 in the clockwise direction.

Figure 2:
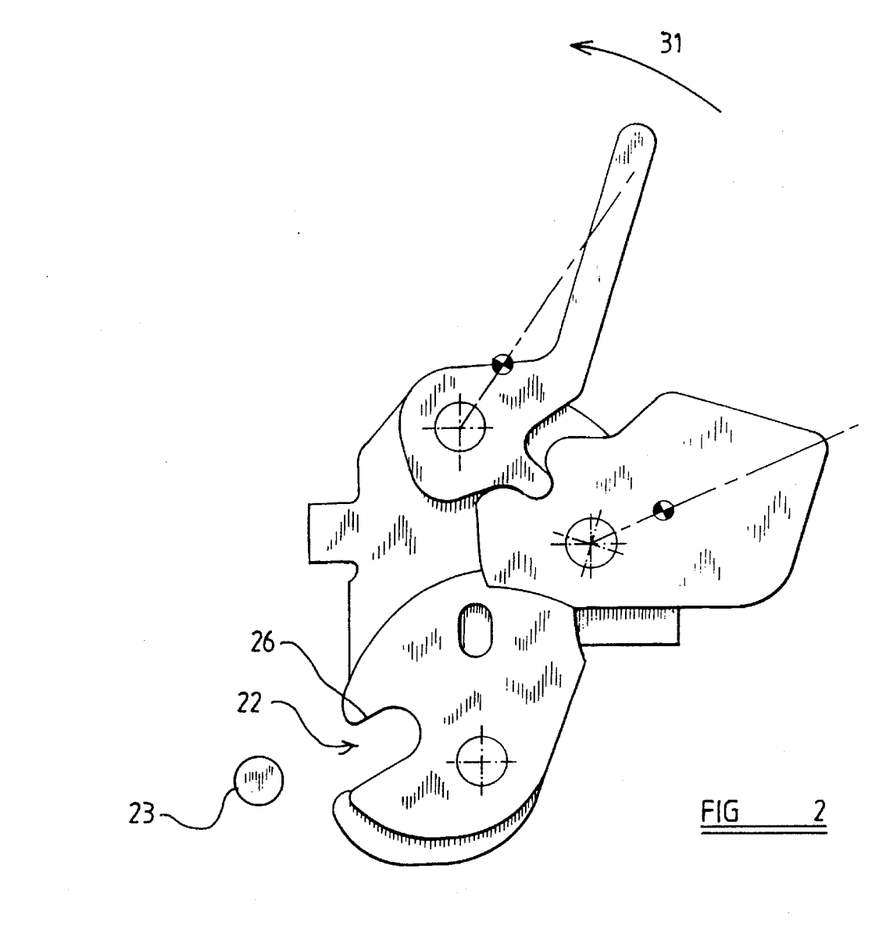
FIG. 2 is a view corresponding to FIG. 1 showing the locking arrangement of FIG. 1 in the released condition.

When the lockable element 23 is to be released, the handle 4 of the actuating element 3 is pressed to move the handle, as shown by arrow 31 in the counter clockwise direction against a spring bias. Because of the engagement of the projection 5 and the recess 7, the counter weight 8 is moved in the clockwise direction, thus separating the end face 28 of the counter weight from the linear portion 27 of the periphery of the retaining element 24. The end face 28 of the counter weight 8 then becomes aligned with a recess 30 formed in the periphery of the retaining member 24, and the retaining member 24 can rotate in a clockwise sense under the bias imparted thereto by the spring which has one end inserted in the aperture 27. The elongate slot 26 in the retaining element then becomes aligned with the elongate recess 22, thus permitting the lockable element 23 to be moved away from the described locking arrangement. The mechanism is then in a release condition.

It is to be appreciated that the axis of the elongate slot 26 does not pass through the pivot axis 25 of the retaining element 24. Consequently, if the lockable element 23 is reintroduced into the aligned elongate slot 26 and elongate recess 22 and is pressed inwardly, the retaining member 24 will rotate in a clockwise direction, against the spring bias imparted thereto by the spring which has one end inserted in the aperture 29. When the retaining member 24 has rotated a sufficient extent, the end face 28 of the counter weight 8 will be removed from the recess 30, and, by virtue of the spring bias applied to the actuating element 3 by the spring, the actuating element 3 will tend to move in a clockwise direction, causing the counter weight to move in a counter-clockwise direction, thus bringing the end face 28 of the counter weight into engagement with the linear portion 27 of the periphery of the retaining member 24. The locking arrangement is thus returned to the locked condition of FIG. 1.

Whilst in the described arrangement centres of gravity of the actuating element 3 and the counter weight 8 are offset to one side of the plane defined by the parallel pivot axes 2 and 9, the centres of gravity could, when in the locking position, lie on that plane, or could even be substantially coincident with the respective pivot axes. In such a case the locking mechanism will not be adversely effected by acceleration, deceleration or rotation.

Figure 3:
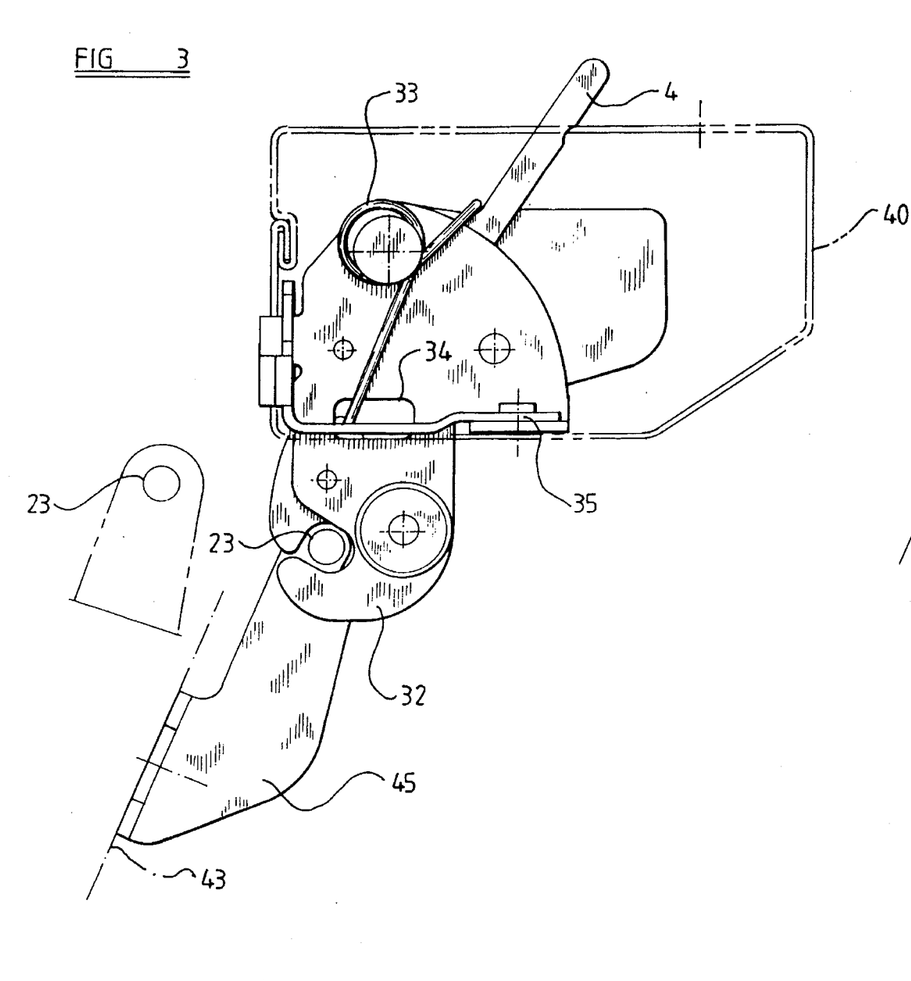
FIG. 3 is a view of a locking arrangement of FIG. 1 when incorporated within a movable beam present in a motor vehicle.
Figure 4:
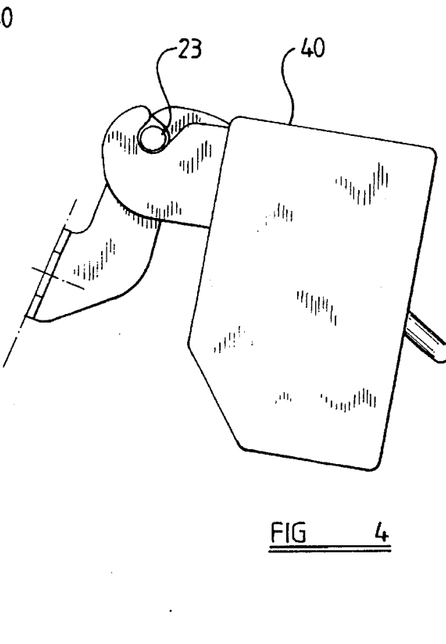
FIG. 4 is a view of the beam of FIG. 3 in an alternate position.
Figure 5:
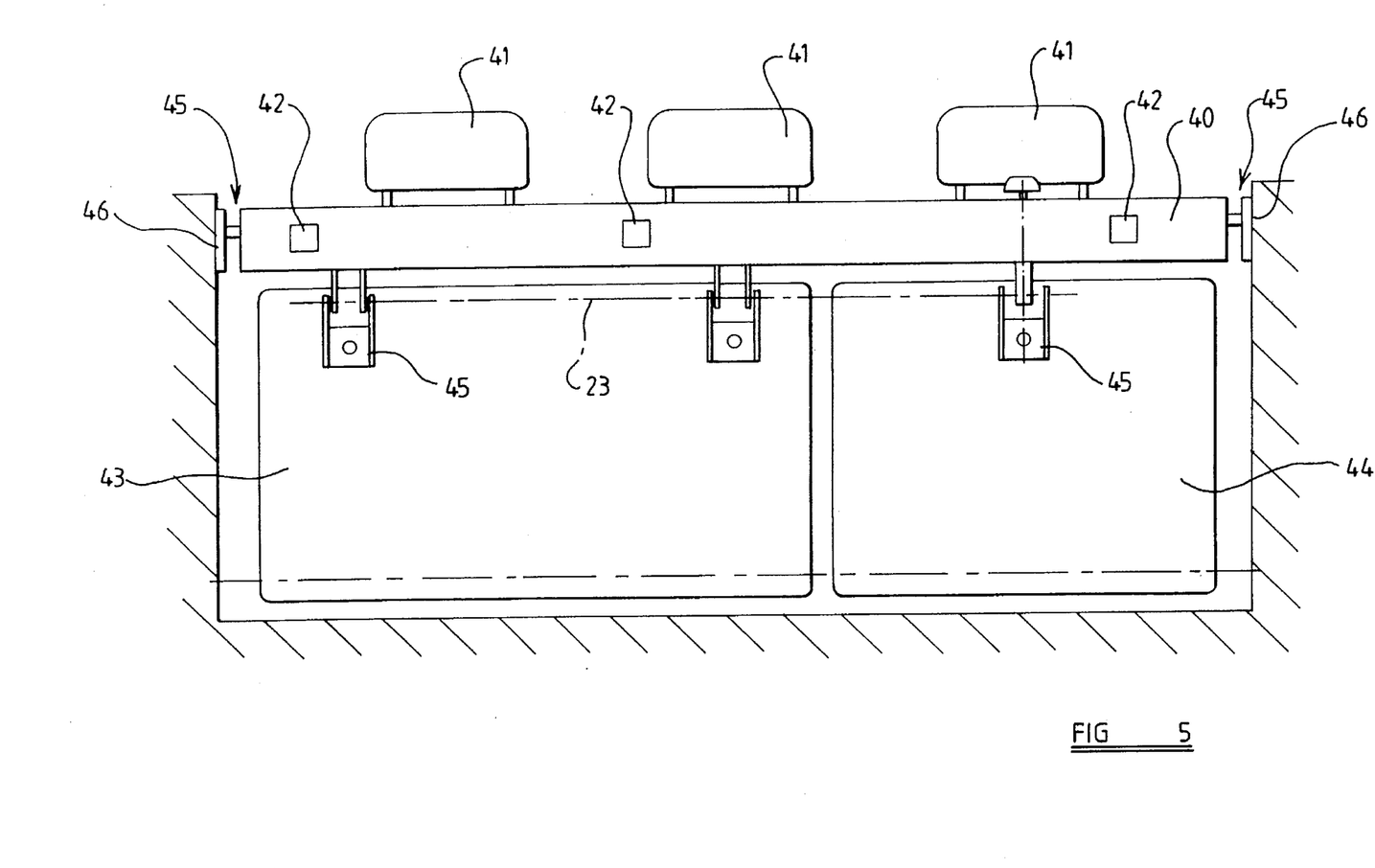
FIG. 5 is a view of the beam and a seating arrangement associated with the beam.

Referring now to FIGS. 3 to 5, a locking arrangement of the type described above may be incorporated within a beam 40 adapted to extend transversely of a motor vehicle and adapted to carry head rests 41, and retractor reel assemblies 42. The locking arrangement may be utilised to engage lockable elements which are present on the rear faces of portions 43,44 of a vehicle seat.

It is to be noted that the transverse beam 40 is provided with securing arrangements 45 at either end thereof, adapted to engage mounting plates 46 provided at each side of the motor vehicle.

Referring now in more detail to FIG. 3 the locking arrangement generally as described with reference to FIGS. 1 and 2, is shown illustrated in position although the movable components are illustrated as mounted between a first support plate 1, as described above, and a second support plate 32.

The spring, mentioned in the aforegoing description, is shown as spring 33, part of the spring passes through an oval aperture 34 present in the support plate 32, to engage the aperture 29 of the retaining element 24.

A mounting lug 35 is illustrated for mounting the described mechanism in position within the interior of the beam 40. The handle 4 of the actuating element 3 projects above the top of the beam 40.

The lockable element 23 comprises an elongate rod which is supported by support arms 45 which are secured to the rear face of the portions 43,44 of the vehicle seats. The single transverse rod extends substantially across the width of the motor vehicle parallel with the beam 40. It is to be observed, from FIG. 4, that the beam 40 may be moved pivotally relative to the rod 23. It may be desired to move the beam 40 in this manner to disconnect the securing arrangements 45 from the mounting plates 46 to permit the combination of the beam 40 and the backs of the seats 43,44, to be lowered to enable the part of a motor vehicle normally provided with rear seats to be utilised to carry cargo or luggage.

Figure 6:
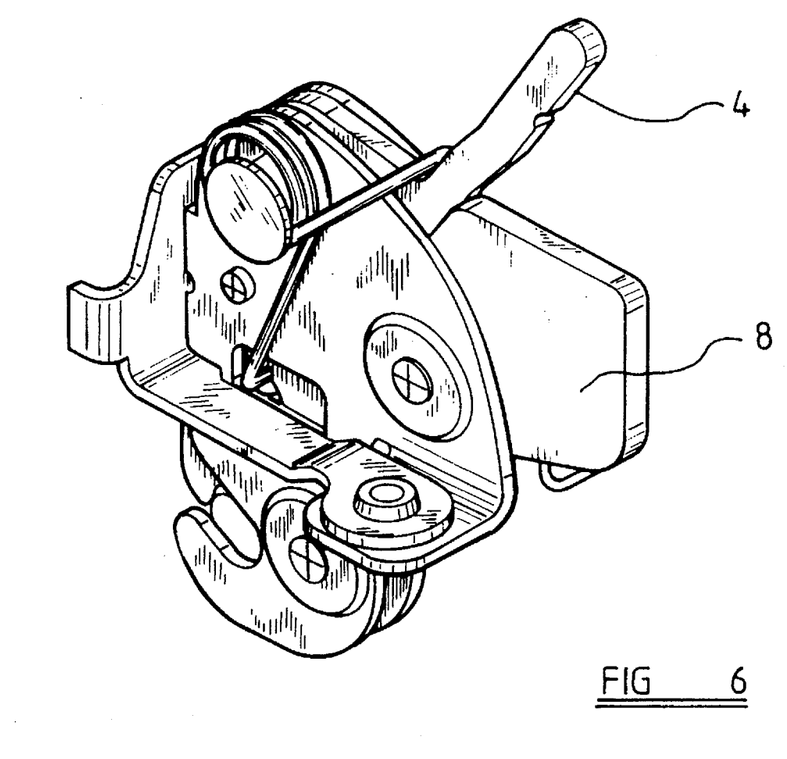
FIG. 6 is a perspective view of the locking arrangement of FIGS. 1 to 3 and FIG. 6.
Figure 7:
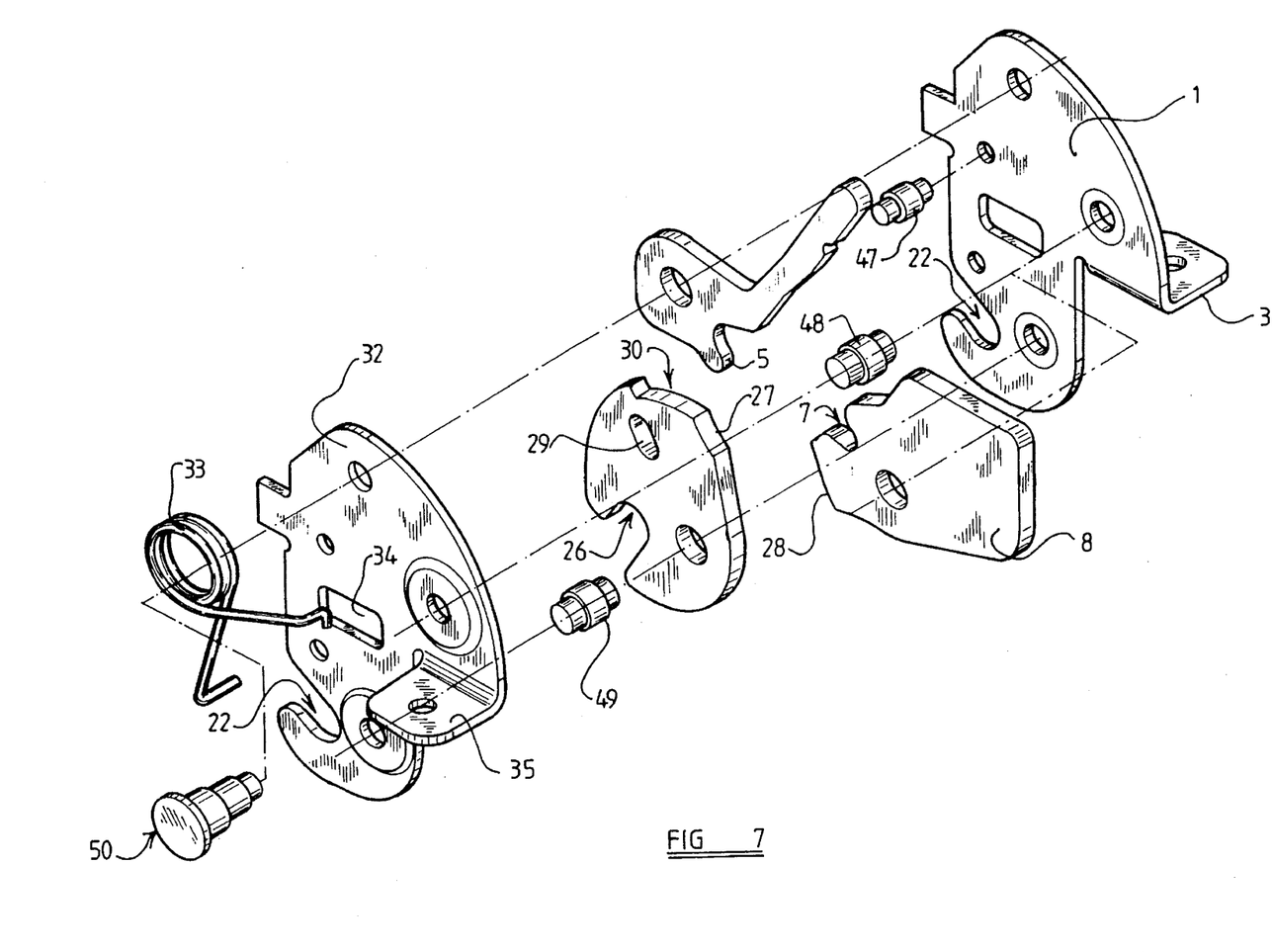
FIG. 7 is an an exploded view of the locking arrangement of FIGS. 1 to 3 and FIG. 6.

FIGS. 6 and 7 illustrate the components of a locking arrangement as described with reference to FIGS. 1 to 3 in the assembled state, and in the exploded form respectively.

It can be seen that both the support plate 1 and the support plate 32 are provided with perpendicularly extending mounting lugs 35.

The two support plates 1 and 32 are held spaced apart by three spacer elements, (47–49) each spacer element having an enlarged central portion and two smaller end portions that are received in apertures in the plates. A first spacer element 47 acts solely as a spacer element, whereas spacer elements 48 and 49 serve to define pivot axes 9 and 25 respectively. The pivot axis 2 is defined by an inserted plug 50.

Figure 8:
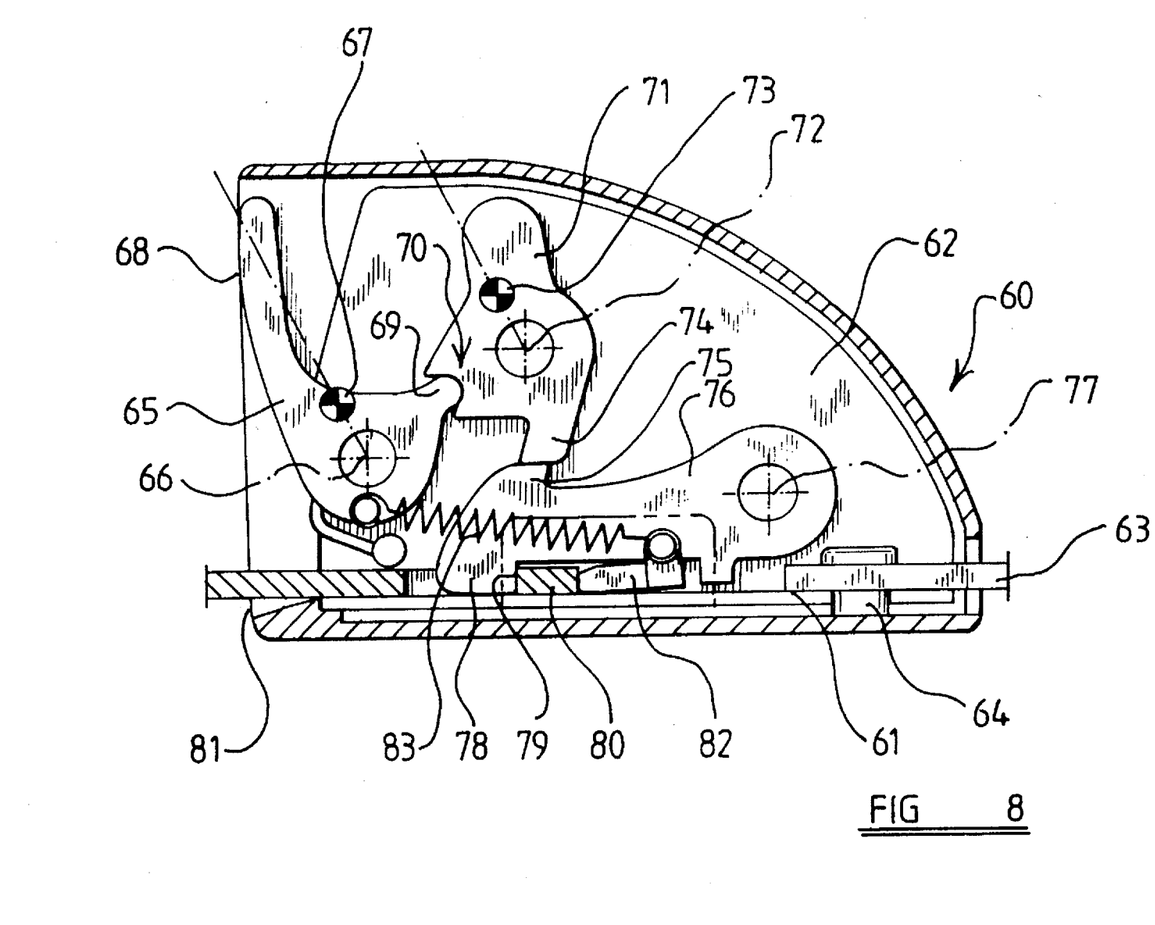
FIG. 8 is an diagrammatic view of an alternate form of locking arrangement in accordance with the invention forming part of a seat belt buckle, the buckle being in the latched condition.
Figure 9:
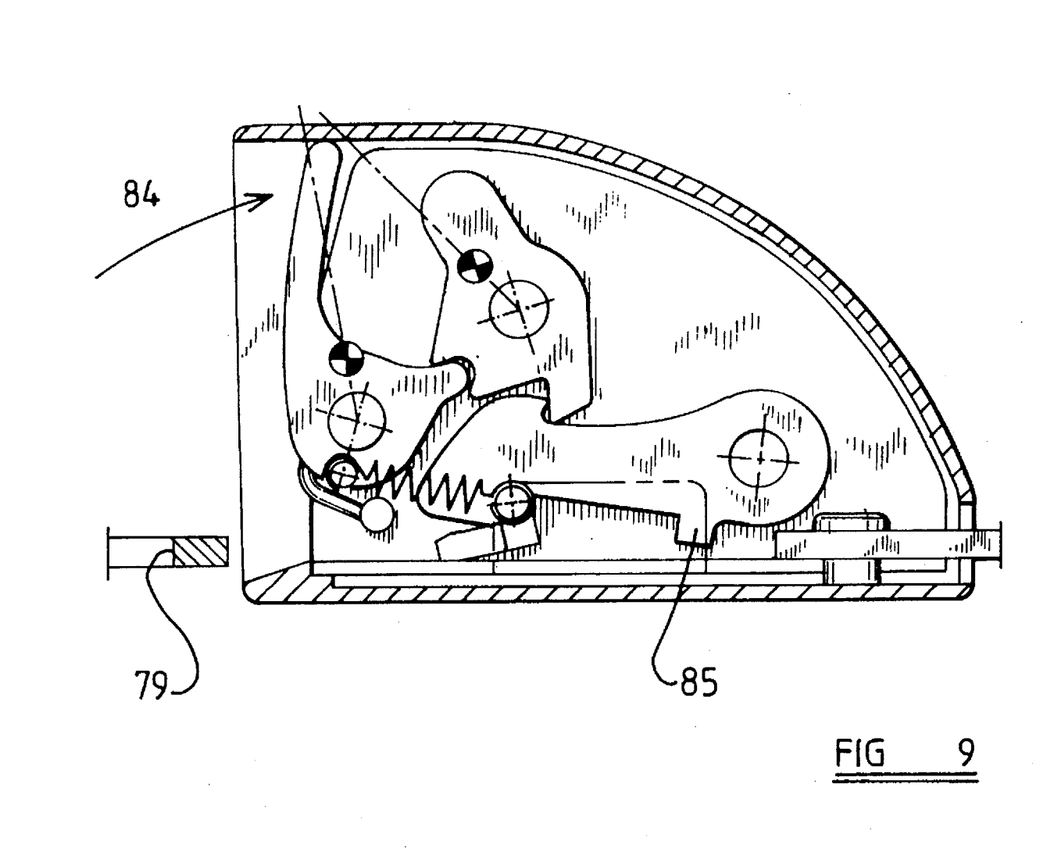
FIG. 9 is an view showing the locking arrangement of FIG. 8 when in the unlatched condition.

Referring now to FIGS. 8 and 9 of the accompanying drawings, a further locking arrangement in accordance with the invention is illustrated forming part of a buckle adapted to receive a tongue present on a safety belt.

The buckle is contained within a housing 60. The housing contains a channel member having a base 61 and upstanding side walls only one of which, 62, is illustrated.

A metal strap 63 is provided secured to the base 61 of the channel by means of a stud or rivet 64. The strap 63 projects beyond the housing 60, to enable the housing 60 to be secured to an appropriate part of a motor vehicle.

An actuating element 65 is provided, pivotally connected to the side wall 2 for pivotal movement about a pivot axis 66. The actuating element 65 has a centre of gravity 67 and an operating handle 68. A projecting lug 69 on the actuator element 65 is received within a recess 70 which forms part of the periphery of a counter weight 71 which is pivotally mounted on the side wall 62 for pivotal movement about a pivot axis 72. The pivot axis 72 is parallel with the pivot axis 66. The counter weight has a centre of gravity 73. A depending projection 74 on the counter weight 71 engages an upstanding projection 75 formed on a retaining element 76. The retaining element 76 is of generally elongate form and is pivotally connected to the side wall 61 for pivotal movement about a pivot axis 77. The retaining element 76 defines, at a forward end, in the region of the projection 75, a depending tooth 78 which defines a face 79 which engages part 80 of a tongue 81 which is connected to a seat belt. The tooth 78 may engage a central aperture defined within the tongue, as is conventional. The tongue 81 comprises a lockable element.

A tongue ejector 82 is provided which is connected by means of a spring 83 to the actuating element 65. The tongue ejector serves to eject the tongue from the buckle when the buckle is released.

The centres of gravity 67 and 73 of the actuating element 65 and the counter weight 71 are positioned, offset to one side of the plane defined by their axes of rotation 66 and 72 that the same effect is observed as described with reference to the embodiment of FIG. 1 in that, as far as any acceleration or deceleration or rotation forces are concerned, the components are substantially "in balance" and thus will not tend to move from the illustrated position. Alternatively, the centres of gravity may, when the buckle is in the locked condition, lie in the plane defined by the axes of rotation, or even may be coincident with the axes of rotation.

It is to be observed that when the various components described above are in the position illustrated in FIG. 8, the buckle is in a locked condition and the retaining member 76 cannot move from the retaining position, and thus the tongue 81 is securely held within the buckle.

If a force is applied to the handle 68, of the actuating element 65, as indicated by the arrow 84, the actuating element 65 will move in a clockwise direction against the spring bias imparted thereto by the spring 83. Because of the inter-engagement of the lug 69 and the recess 70, the counter weight will move in a counter clockwise direction, thus disengaging the depending projection 74 from the upstanding projection 75, as the counter weight moves to the position shown in FIG. 9. When the counter weight 71 has moved to the position as illustrated in FIG. 9, the retaining element 76 may pivot upwardly about the pivot axis 77. The spring 83 connected to the ejector 82 causes the ejector 82 to tilt upwardly, thus moving the retaining element 76 pivotally in an upward sense, thus disengaging the depending tooth 78 from the aperture formed in the tongue 81. When the tooth 78 is totally disengaged from the tongue, the tongue 81 will be moved outwardly of the buckle by the spring force applied thereto from the spring 83 by the ejector 82. The ejector 82 has an upstanding part that engages the tooth 78. Thus, the ejector is retained in the buckle and the retaining element 76 is retained in an elevated position to facilitate the re-introduction of the tongue 81 into the buckle. The buckle is thus in the released condition.

It is to be appreciated that when the tongue is re-inserted into the buckle, initially the ejector is moved towards the right as shown in FIGS. 8 and 9 against the bias of the spring 83, until the ejector engages a depending lug 85 formed at the end of the retaining element 76 adjacent the pivot axis 77. This causes the retaining element to pivot in a counter clockwise sense bringing the depending tooth 78 into engagement with the aperture formed in the tongue 81. When the retaining element 76 has moved to this position, the counter weight 71 and the actuating element 65 will move, by virtue of the spring bias supplied thereto by the spring 83, returning the actuating element and the counter weight to the position illustrated in FIG. 8 with the buckle then again being in the locked condition.

Figure 10:
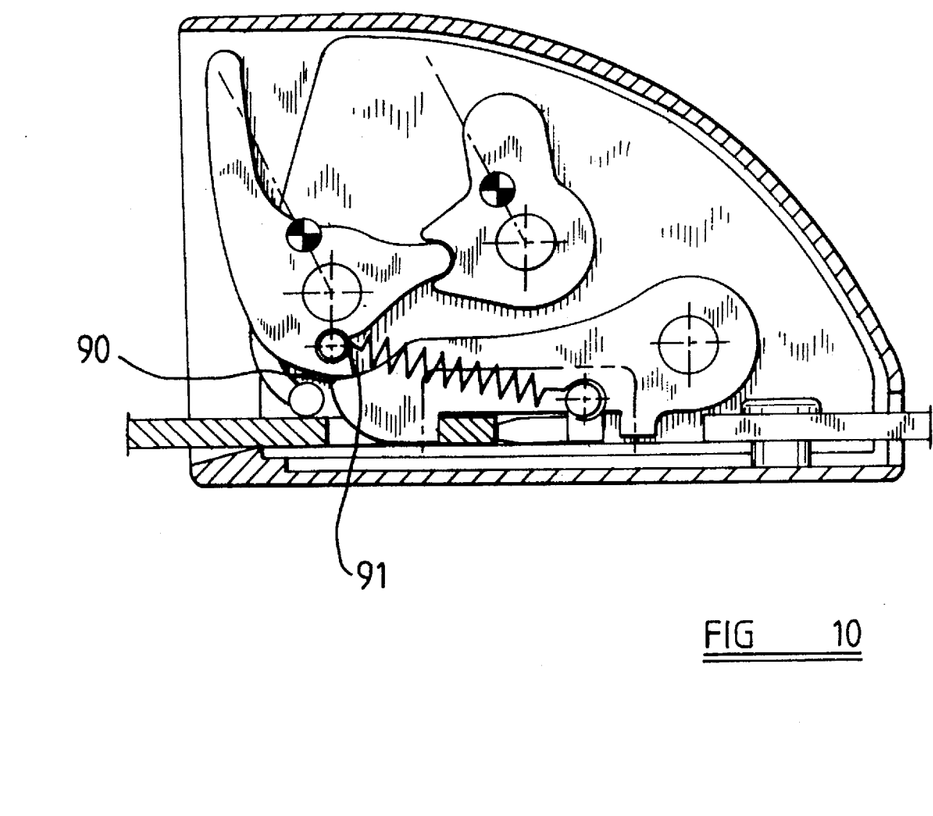
FIG. 10 is a view corresponding to FIG. 8 showing an alternative locking arrangement incorporated in a buckle when in the latched position.
Figure 11:
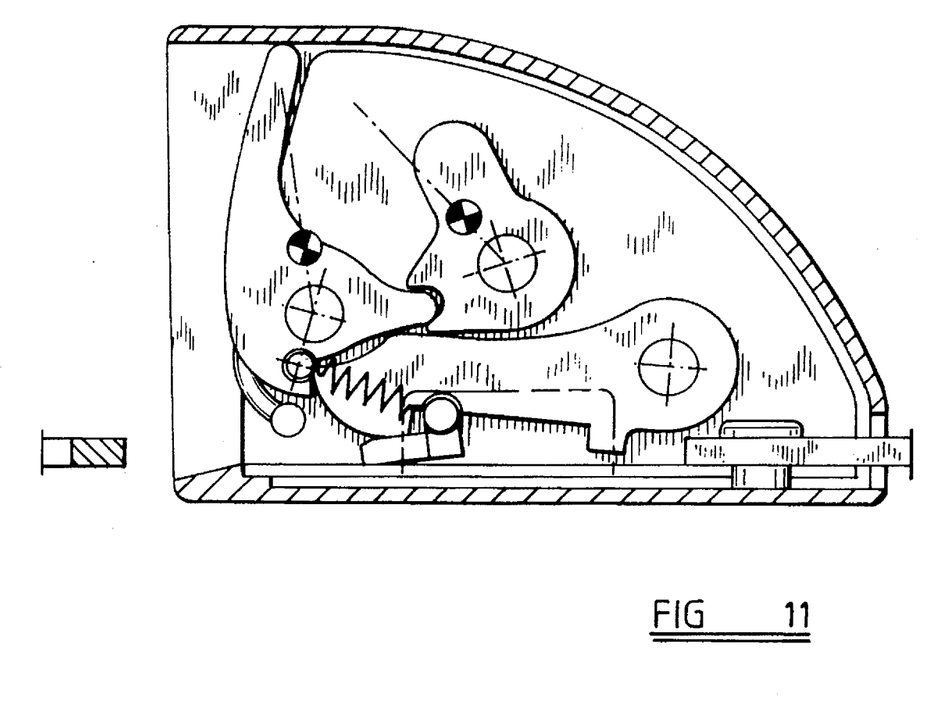
FIG. 11 is a view corresponding to FIG. 9 showing the locking arrangement of FIG. 10 in the unlatched condition.

If reference is made to the buckle of FIGS. 10 and 11 it can be seen that the described arrangement is very similar to that disclosed with reference to FIGS. 8 and 9, but instead of the retaining member being retained by a depending lug present on the counter weight, it is retained by a depending lug 90 that is formed on the actuating element. When the actuating element is in the first position as illustrated in FIG. 10, the depending lug engages a terminal part 91 of the upper surface of the retaining element, and if the actuating element 65 is moved in the clockwise sense, the depending lug 90 becomes disengaged from the terminal portion 91 of the upper surface of the retaining element, permitting the retaining element to be moved, by virtue of the force applied thereto by the tongue ejector to a released position as shown in FIG. 11.

It is to be noted that in the embodiments of FIGS. 8 to 11, the tongue comprises an equivalent of the lockable element of the embodiment described with reference to FIGS. 1 to 7, since the tongue is retained in position when the arrangement is in the locking condition and is released when the locking arrangement is in the release condition.

What is claimed is:

1. A locking arrangement having a locked condition in which a lockable element is retained, and a released condition in which the lockable element is released, the locking arrangement comprising:

a support element;

a retaining element pivotally connected to said support element and being movable to a first position to retain the lockable element when the locking arrangement is in the locked condition, and being movable to a second position in which the lockable element is not retained when the locking arrangement is in the released condition;

an actuating element pivotally mounted on said support element to be pivotable about a first pivot axis; and a counter weight associated with the retaining element, the counter weight being pivotally mounted on said support element to be pivotable about a second pivot axis parallel to the first pivot axis, said counter weight being inter-connected with said actuating element so that, when said locking arrangement is in the locked condition, rotation of the actuating element in a first direction causes a rotation of the counter weight in a second direction opposite to the first direction, and rotation of the counter weight in the second direction causes a rotation of the actuating element in the first direction, the actuating element and the counter weight each having centres of gravity arranged relative to a plane defined by the parallel pivot axes so that, when the locking arrangement is in the locked condition, any force on the locking arrangement tending to rotate either one of the counter weight and actuating element in one of the first and second directions will tend to cause the other one of the counter weight and actuating element to rotate in the same direction so that rotational forces acting on the counter weight and actuating element are substantially balanced, the actuating element and counter weight being movable manually between a locked position, corresponding to the locked condition, in which the combination of the actuating element and the counter weight lock the retaining element in the first position, and a release position, corresponding to the released condition, in which the retaining element is free to move to the second position.

2. A locking arrangement according to claim 1, wherein the retaining element is locked in the first position by engaging the retaining element with a part of the counter weight.

3. A locking arrangement according to claim 1, wherein the retaining element is locked in the first position by engaging the retaining element with a part of the actuating element.

4. A locking arrangement according to claim 1, wherein the locking arrangement is adapted to retain in position a tiltable element forming part of a back-rest of a seat in a motor vehicle.

5. A locking seat assembly for a motor vehicle, comprising:

a back-rest having at least one tiltable portion; and a locking arrangement having a locked condition, and a released condition, said locking arrangement comprising:

a lockable element operatively connected to said back rest, said lockable element and said tiltable portion being retained when said locking arrangement is in the locked condition, and being released when said locking arrangement is in the released condition;

a support element;

a retaining element pivotally connected to said support element and being movable to a first position to retain the lockable element when the locking arrangement is in the locked condition, and being movable to a second position in which the lockable element is not retained when the locking arrangement is in the released condition;

an actuating element pivotally mounted on said support element to be pivotable about a first pivot axis; and a counter weight associated with the retaining element, the counter weight being pivotally mounted on said support element to be pivotable about a second pivot axis parallel to the first pivot axis, said counter weight being inter-connected with said actuating element so that, when said locking arrangement is in the locked condition, rotation of the actuating element in a first direction causes a rotation of the counter weight in a second direction opposite to the first direction, and rotation of the counter weight in the second direction causes a rotation of the actuating element in the first direction, the actuating element and the counter weight each having centers of gravity arranged relative to a plane defined by the parallel pivot axes so that, when the locking arrangement is in the locked condition, any force on the locking arrangement tending to rotate either one of the counter weight and actuating element in one of the first and second directions will tend to cause the other one of the counter weight and actuating element to rotate in the same direction so that rotational forces acting on the counter weight and actuating element are substantially balanced, the actuating element and counter weight being movable manually between a locked position, corresponding to the locked condition, in which the combination of the actuating element and the counter weight lock the retaining element in the first position, and a release position, corresponding to the released condition, in which the retaining element is free to move to the second position.

6. A locking seat assembly according to claim 5, wherein the tiltable portion of the back-rest comprises only part of the back rest, the back rest further comprising an additional portion located next to the tiltable portion.

7. A locking seat assembly according to claim 6, wherein the additional portion of the back rest is tiltable and is provided with its own respective locking arrangement.

8. A locking seat assembly according to claim 5, further comprising a beam located within the vehicle, extending transversely to the vehicle, and being tiltable relative to the vehicle, wherein the locking arrangement is located on the beam.

9. A locking seat assembly according to claim 8, wherein the beam is tiltable relative to the back rest about an axis defined by the lockable element.

10. A safety belt buckle locking arrangement having a locked condition in which a lockable tongue of a safety belt is retained, and a released condition in which the lockable tongue is released, the locking arrangement comprising:

a support element;

a retaining element pivotally connected to said support element and being movable to a first position to retain the lockable tongue when the locking arrangement is in the locked condition, and being movable to a second position in which the lockable tongue is not retained when the locking arrangement is in the released condition;

an actuating element pivotally mounted on said support element to be pivotable about a first pivot axis; and a counter weight associated with the retaining element, the counter weight being pivotally mounted on said support element to be pivotable about a second pivot axis parallel to the first pivot axis, said counter weight being inter-connected with said actuating element so that, when said locking arrangement is in the locked condition, rotation of the actuating element in a first direction causes a rotation of the counter weight in a second direction opposite to the first direction, and rotation of the counter weight in the second direction causes a rotation of the actuating element in the first direction, the actuating element and the counter weight each having centers of gravity arranged relative to a plane defined by the parallel pivot axes so that, when the locking arrangement is in the locked condition, any force on the locking arrangement tending to rotate either one of the counter weight and actuating element in one of the first and second directions will tend to cause the other one of the counter weight and actuating element to rotate in the same direction so that rotational forces acting on the counter weight and actuating element are substantially balanced, the actuating element and counter weight being movable manually between a locked position, corresponding to the locked condition, in which the combination of the actuating element and the counter weight lock the retaining element in the first position, and a release position, corresponding to the released condition, in which the retaining element is free to move to the second position.

* * * * *